United States Patent
Bercovici et al.

(10) Patent No.: US 9,792,320 B2
(45) Date of Patent: Oct. 17, 2017

(54) SYSTEM AND METHOD FOR PERFORMING SHARD MIGRATION TO SUPPORT FUNCTIONS OF A CLOUD-BASED SERVICE

(71) Applicant: Box, Inc., Los Altos, CA (US)

(72) Inventors: Tamar Bercovici, Los Altos, CA (US); Florian Jourda, San Francisco, CA (US); Benjamin Trombley-Shapiro, San Francisco, CA (US)

(73) Assignee: Box, Inc., Redwood City, CA (US)

(*) Notice: Subject to any disclaimer, the term of this patent is extended or adjusted under 35 U.S.C. 154(b) by 658 days.

(21) Appl. No.: 13/937,060

(22) Filed: Jul. 8, 2013

(65) Prior Publication Data

US 2014/0012814 A1    Jan. 9, 2014

Related U.S. Application Data

(60) Provisional application No. 61/668,626, filed on Jul. 6, 2012.

(51) Int. Cl.
*G06F 17/30* (2006.01)

(52) U.S. Cl.
CPC .. *G06F 17/30377* (2013.01); *G06F 17/30578* (2013.01)

(58) Field of Classification Search
CPC ......... G06F 17/30377; G06F 17/30578; G06F 11/1666; G06F 3/0647; G06F 3/067; G06F 21/6218
See application file for complete search history.

(56) References Cited

U.S. PATENT DOCUMENTS

| 5,799,320 A | 8/1998 | Klug |
| 5,848,415 A | 12/1998 | Guck |
| 5,999,908 A | 12/1999 | Abelow |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,233,600 B1 | 5/2001 | Salas et al. |
| 6,289,345 B1 | 9/2001 | Yasue |

(Continued)

FOREIGN PATENT DOCUMENTS

| CA | 2724521 | 11/2009 |
| CN | 101997924 A | 3/2011 |

(Continued)

OTHER PUBLICATIONS

"Database Scalability, Elasticity, and Autonomy in the Cloud" Agrawal et al. (Jan. 2011).*

(Continued)

*Primary Examiner* — Shew-Fen Lin
(74) *Attorney, Agent, or Firm* — Perkins Coie LLP

(57) ABSTRACT

Systems and methods of maintaining a horizontally scaled database based on data ownership for a cloud-based platform (e.g., cloud-based collaboration and/or storage platform/service) are disclosed. The system database comprises multiple shard databases, and all files and folders owned by a user are stored on a single shard database. When a user transfers ownership of a file and/or a folder to a second user, the transferred file and/or folder is stored on the shard database that stores all of the data for the second user.

28 Claims, 10 Drawing Sheets

(56) References Cited

U.S. PATENT DOCUMENTS

| | | |
|---|---|---|
| 6,292,803 B1 | 9/2001 | Richardson et al. |
| 6,336,124 B1 | 1/2002 | Alam et al. |
| 6,341,340 B1* | 1/2002 | Tsukerman ....... G06F 17/30575 |
| | | 707/E17.007 |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B1 | 12/2006 | Ji et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,469,257 B2* | 12/2008 | Parlin ............... G06F 17/30038 |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,347,276 B2 | 1/2013 | Schadow |
| 8,358,701 B2 | 1/2013 | Chou et al. |
| 8,429,540 B1 | 4/2013 | Yankovich et al. |
| 8,464,161 B2 | 6/2013 | Giles et al. |
| 8,549,066 B1 | 10/2013 | Donahue et al. |
| 8,549,511 B2 | 10/2013 | Seki et al. |
| 8,607,306 B1 | 12/2013 | Bridge et al. |
| 2001/0027492 A1 | 10/2001 | Gupta |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0039001 A1* | 2/2005 | Hudis ................. G06F 21/6218 |
| | | 713/166 |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242028 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0038934 A1 | 2/2007 | Fellman |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |

(56) References Cited

U.S. PATENT DOCUMENTS

| | | |
|---|---|---|
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0256065 A1 | 11/2007 | Heishi et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0037679 A1* | 2/2009 | Kaushik ............... G06F 3/0617 711/162 |
| 2009/0044128 A1 | 2/2009 | Baumgarten et al. |
| 2009/0049131 A1 | 2/2009 | Lyle et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0240664 A1* | 9/2009 | Dinker ............... G06F 12/0842 |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0030995 A1* | 2/2010 | Wang ............... G06F 17/30339 711/173 |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0322252 A1 | 12/2010 | Suganthi et al. |
| 2010/0325155 A1 | 12/2010 | Skinner et al. |
| 2010/0325655 A1 | 12/2010 | Perez |
| 2010/0332401 A1 | 12/2010 | Prahlad et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0119313 A1 | 5/2011 | Sung et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |

(56) References Cited

U.S. PATENT DOCUMENTS

| | | |
|---|---|---|
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252320 A1 | 10/2011 | Arrasvuori et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0307450 A1* | 12/2011 | Hahn ............... G06F 17/30339 707/649 |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0110005 A1 | 5/2012 | Kuo et al. |
| 2012/0110436 A1 | 5/2012 | Adler, III et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0240061 A1 | 9/2012 | Hillenius et al. |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0305039 A1 | 11/2013 | Gauda |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0156373 A1 | 6/2014 | Roberts et al. |
| 2014/0172595 A1 | 6/2014 | Beddow et al. |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 | 10/2008 |
| KR | 20020017444 A | 3/2002 |
| KR | 20040028036 | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

(56) References Cited

FOREIGN PATENT DOCUMENTS

OTHER PUBLICATIONS

Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," Published by O'Reilly Media, May 27, 2008, 24 pages.
Exam Report for EP13158415.3. Applicant: Box, Inc. Mailed Jun. 4, 2013, 8 pages.
Exam Report for GB1300188.8. Applicant: Box, Inc. Mailed May 31, 2013, 8 pages.
Exam Report for GB1306011.6. Applicant: Box, Inc. Mailed Apr. 18, 2013, 8 pages.
International Search Report and Written Opinion for PCT/US2008/012973 dated Apr. 30, 2009, pp. 1-11.
International Search Report and Written Opinion for PCT/US2010/070366, Applicant: Box, Inc., Mailed Mar. 24, 2013, 10 pages.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2012/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
Internet Forums, http://web.archive.org/web/20100052819550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com. pp. 1-32.
Palmer, "Load Balancing FTP Servers." BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Exam Report for GB1410569.6 Applicant: Box, Inc. Mailed Jul. 11, 2014, 9 pages.
"Revolving sync conflicts; frequently asked questions," Microsoft Tech Support, Jul. 16, 2012, retrieved from the internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF .JS," retrieved from the internet, http://people.mozilla.org, Oct. 12, 2012, 36 pages.
Delendik, "My PDF .js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1318792.7, Applicant: Box, Inc. Mailed May 22, 2014, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.

(56) References Cited

OTHER PUBLICATIONS

Rao, "Box Acquires Crocodoc To Add HTML5 Document Converter And Sleek Content Viewing Experience To Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Sommerer, "Presentable Document Format: Improved On-demand PDF to HTML Conversion," retrieved from the internet, http://research.microsoft.com, Nov. 2004, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
John et al., "Always Sync Support Forums—View topic—Allway sync funny behavior," Allway Sync Support Forum at http://sync-center.com, Mar. 28, 2011, XP055109680, 2 pages.
Search Report for EP14151588.2, Applicant: Box, Inc. Mailed Apr. 15, 2014, 12 pages.
"PaperPort Professional 14," PC Mag. Com review, published Feb. 2012, Ziff Davis, Inc., 8 pages.
"PaperPort." Wikipedia article (old revision), published May 19, 2012. Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision). published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310566.1, Applicant: Box, Inc. Mailed Aug. 30, 2013, 10 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1313559.5, Applicant: Box, Inc. Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an empahsis on Google App Engine," Master Final Project, Sep. 2011, 146 pages.
Google Docs, http://web.Archive.org/web/20100413105756/http://en.wikipedia.org/wiki/Google_docs, Apr. 13, 2010, 6 pages.
International Search Report and Written Opinion for PCT/US2013/039782, Applicant: Box, Inc., Mailed Aug. 28, 2013, 15 pages.
Patent Court Document of Approved Judgement for GB0602349.3 and GB0623571.7; Mar. 3, 2009, 17 pages.
Exam Report for GB1311417.8, Applicant: Box, Inc. Mailed Dec. 20, 2013, 5 pages.
International Search Report and Written Opinion for PCT/US2013/034765, Applicant: Box, Inc., Mailed Jan. 20, 2014, 15 pages.
Exam Report for EP13185269.1. Applicant: Box, Inc. Mailed Jan. 28, 7 pages.
"Avergae Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Cornes, "MediaXchange User's Manual," Version 1.15.15, Feb. 1, 2009, pp. 1-90.
Exam Report for GB1308642.2, Applicant: Box, Inc. Mailed Mar. 10, 2014, 4 pages.
Exam Report for GB1312264.3, Applicant: Box, Inc. Mailed Mar. 24, 2014, 7 pages.
Exam Report for GB1314771.5, Applicant: Box, Inc. Mailed Feb. 17, 2014, 7 pages.
John et al., "Always Sync Support Forums—View topic—Allway sync funny behavior," Allway Sync Support Forum at http://sync.center.com, Mar. 28, 2011, XP055109680, 2 pages.
Exam Report for EP 11729851.3, Applicant: Box, Inc. Mailed Feb. 7, 2014, 9 pages.
Exam Report for EP14151588.2, Applicant: Box, Inc. Mailed Apr. 15, 2014, 12 pages.
Exam Report for EP14153783.7, Applicant: Box, Inc. Mailed Mar. 24, 2014, 7 pages.

* cited by examiner

| | parent | path |
|---|---|---|
| Folder A | root | / |
| Folder B | Folder A | /Folder A/ |
| Folder C | Folder A | /Folder A/ |
| Folder D | Folder C | /Folder A/ Folder C/ |

SYSTEM AND METHOD FOR PERFORMING SHARD MIGRATION TO SUPPORT FUNCTIONS OF A CLOUD-BASED SERVICE

CROSS-REFERENCE TO RELATED APPLICATIONS AND EFFECTIVE FILING DATE ENTITLEMENT

This application claims the benefit of and/or the right of priority to U.S. Provisional Patent Application No. 61/668,626 entitled "ONLINE SHARD MIGRATION," which was filed on Jul. 6, 2012, the contents of which are incorporated by reference in their entirety herein.

BACKGROUND

Typically, when a company first starts storing information in a database, all of the information is stored in a single database. As the company grows, more and more information needs to be stored, and the database grows larger. At the same time, the database becomes less efficient because a bottleneck exists at the server handling all of the data requests for the database.

BRIEF DESCRIPTION OF THE DRAWINGS

Examples of a cloud-based platform (e.g., cloud-based collaboration and/or storage platform/service) that uses multiple shard databases that are partitioned by user are illustrated in the figures. The examples and figures are illustrative rather than limiting.

DETAILED DESCRIPTION

A cloud-based platform (e.g., cloud-based collaboration and/or storage platform/service) is described that uses a database partitioned horizontally into multiple shard databases, where data is divided amongst the shard databases according to ownership of the data, and all data owned by a particular user is co-located in the same shard database. Ownership of data can be changed via user-initiated actions within the cloud-based platform (e.g., cloud-based collaboration and/or storage platform/service), that is, a current owner of data can transfer ownership to a different user of the cloud-based platform (e.g., cloud-based collaboration and/or storage platform/service). When change of ownership of data occurs, the system migrates the data, if necessary, to an appropriate shard database associated with the new owner of the data. Location of data within the shard databases is maintained in a mapping database that maps data object identifications to shard identifications.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
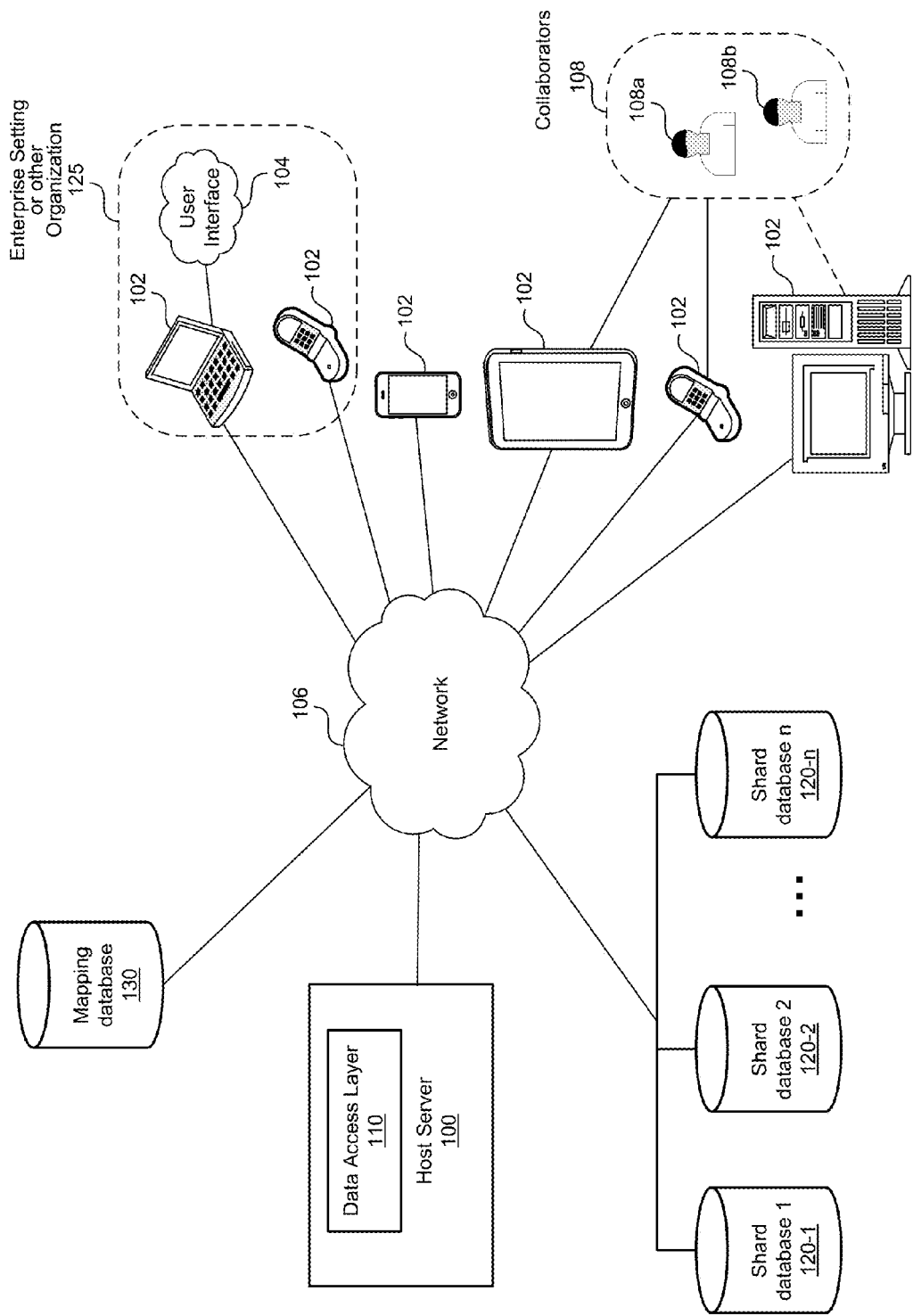
FIG. 1 illustrates an example diagram of a system where a host server supports horizontally scaled databases for data stored in folders or workspaces in an cloud-based platform (e.g., cloud-based collaboration and/or storage platform/service).

FIG. 1 illustrates a diagram of an example system that has a host server 100 with a data access layer 110 that can analyze web application database queries; look up in a mapping database 130 to determine in which of shard database 1, shard database 2, . . . shard database n 120-1, 120-2, . . . 120-n data referenced by a particular query is stored; and move file(s) and/or folder(s) between shard databases based on user-initiated ownership changes. In some embodiments, the data access layer 110 can be an object relational mapping (ORM) layer.

All files and folders that belong to a user are co-located and maintained on a single shard database. In some embodiments, when a user account is associated with an enterprise or a business, all files and folders associated with a single enterprise or business are co-located and maintained on a single shard database. In some embodiments, the host server 100, mapping database 130, and shard databases 120-1 . . . 120-n are directly coupled, rather than coupled through the network 106.

The client devices 102 can be any system and/or device, and/or any combination of devices/systems that is able to establish a connection, including wired, wireless, cellular connections with another device, a server and/or other systems such as host server 100 via, for example, a web application. Client devices 102 will typically include a display and/or other output functionalities to present information and data exchanged between or among the devices 102 and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone (e.g., a BlackBerry device such as BlackBerry Z10/

Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a wearable smart electronic wireless device (e.g., an electronic glasses—Google glass, a smart watch (e.g., a Google watch), a tablet PC, a thin-client, a hand held console, a hand held gaming device or console (e.g., XBOX live, Nintendo DS, Sony PlayStation Portable, etc.), iOS powered watch, Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, and host server 100 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a cloud-based platform (e.g., cloud-based collaboration and/or storage platform/service) (e.g., hosted by the host server 100). The collaboration environment or platform can have one or more collective settings 125 for an enterprise or an organization to which the users belong, and can provide a user interface 104 for the users to access such platform under the settings 125.

The cloud-based service (e.g, collaboration platform or environment) hosts workspaces with work items that one or more users can access (e.g., view, edit, update, revise, comment, add to discussions, download, preview, tag, or otherwise manipulate, etc.). A work item can generally include any type of digital or electronic content that can be viewed or accessed via an electronic device (e.g., device 102). The digital content can include .PDF files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate on efforts on work items such that each user can see, remotely, edits, revisions, comments, or annotations being made to specific work items through their own user devices. For example, a user can upload a document to a workspace for other users to access (e.g., for viewing, editing, commenting, discussing, signing-off, or otherwise manipulating). The user can login to the online platform and upload the document (or any other type of work item) to an existing workspace or to a new workspace. The document can be shared with existing users or collaborators in a workspace. Each document, work item, file, and folder can only be owned by a single user. However, the owner of the document, work item, file, or folder can transfer ownership to another collaborator.

Figure 4:
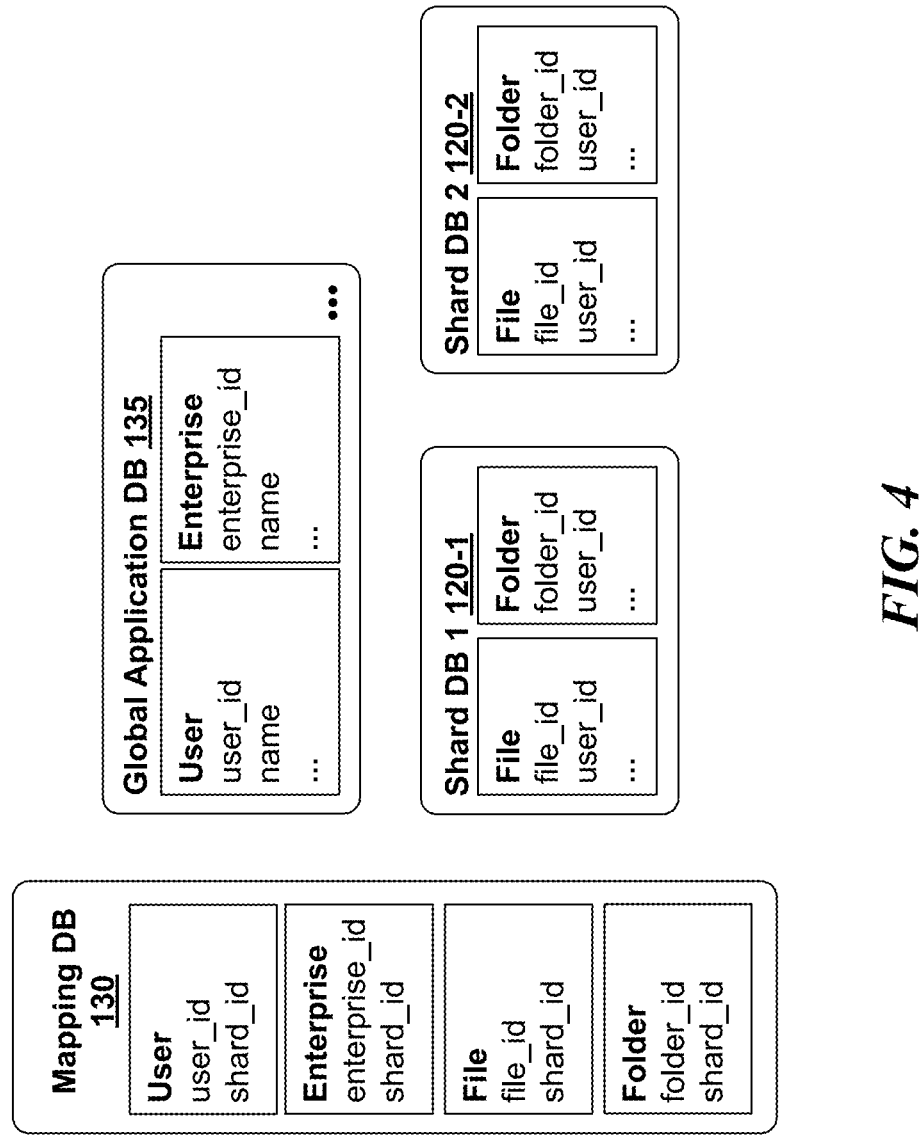
FIG. 4 depicts an example schema layout.

The shard databases 120-1 . . . 120-*n* are each a sub-database of the system. Each table in the system database is split amongst the shard databases 120-1 . . . 120-*n*. As an illustration, FIG. 4 shows an example schema layout with two shard databases 120-1 and 120-2. The file table is split between the two shard databases 120-1 and 120-2, and similarly the folder table is also split between the two shard databases 120-1 and 120-2. Determining which of the rows of the file table and the folder table are placed in each shard database depends upon the owner of the particular file and folder, respectively. That is, all of the files and folders that are owned by a particular user are stored in a single shard database.

The mapping database 130 stores mappings, for example, between a user and the shard database on which data objects owned by the user are stored, between an enterprise and the shard database on which data objects owned by all users associated with the enterprise are stored, between a file and the shard database on which the file is stored, and between a folder and the shard database on which the folder is stored.

In some embodiments, client devices 102 communicate with the host server 100 over network 106. In general, network 106, over which the client devices 102 and the host server 100 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but not limited to, the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In some embodiments, communications to and from the client devices 102 can be achieved by, an open network, such as the Internet, or a private network, such as an intranet and/or the extranet. In some embodiments, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Figure 2:
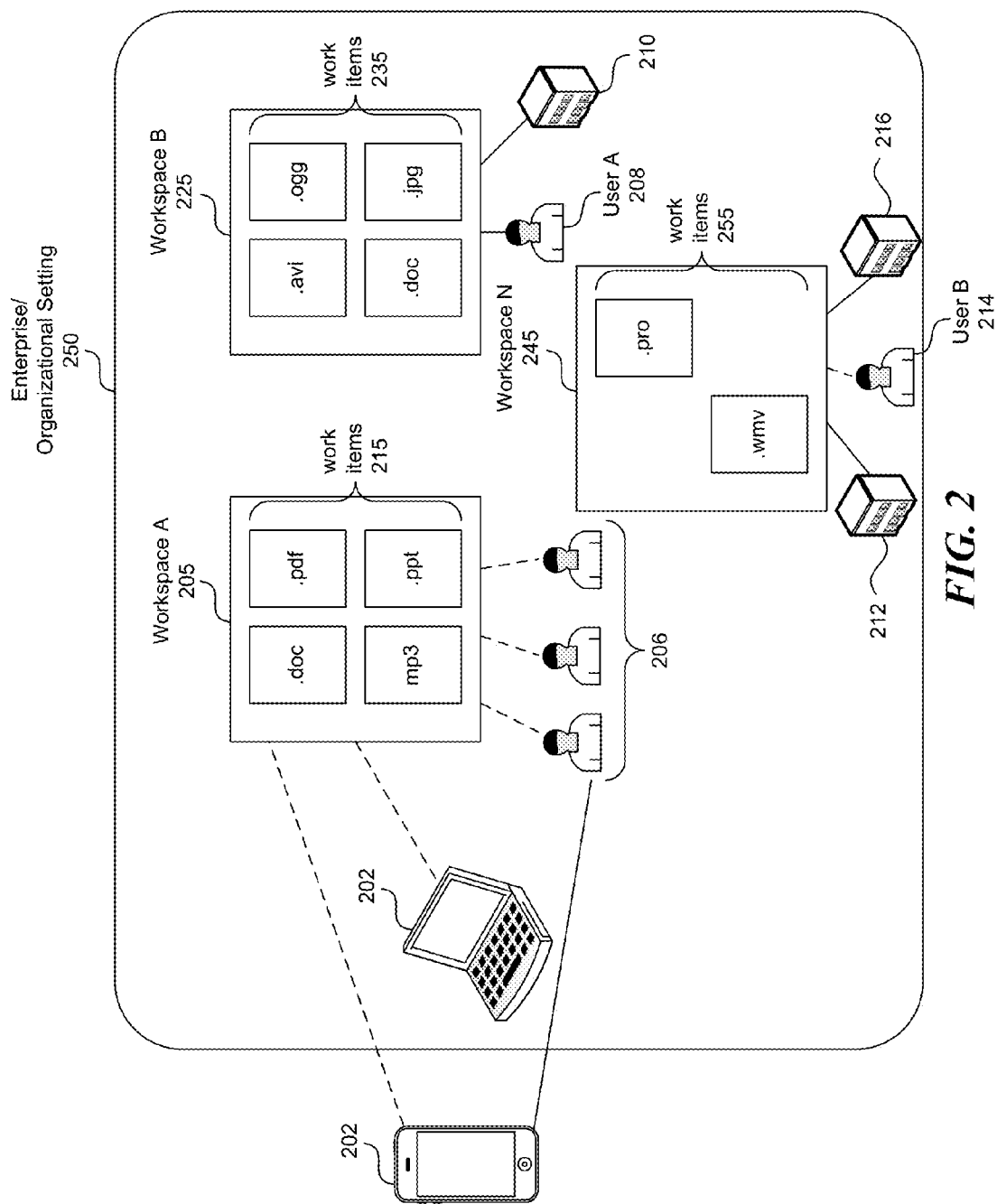
FIG. 2 depicts an example diagram of a web-based or cloud-based platform (e.g., cloud-based collaboration and/or storage platform/service) deployed in an enterprise or other organizational setting for organizing work items and workspaces.

FIG. 2 depicts an example diagram of a web-based or cloud-based platform (e.g., cloud-based collaboration and/or storage platform/service) deployed in an enterprise or other organizational setting 250 for organizing workspaces 205, 225, 245 and work items 215, 235, 255, where the work items and workspaces are hosted on shard databases 1, 2, . . . n 120-1, 120-2, . . . 120-n.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associated work items. For example, workspace A 205 may be associated with work items 215, workspace B 225 can be associated with work items 235, and workspace N 245 can be associated with work items 255. The work items 215, 235, and 255 may be unique to each workspace but need not be. For example, a particular word document can be associated with only one workspace (e.g., workspace A 205) or it may be associated with multiple workspaces (e.g., workspace A 205 and workspace B 225, etc.).

In general, each workspace has a set of users or collaborators associated with it. For example, workspace A 205 is associated with multiple users or collaborators 206. In some instances, workspaces deployed in an enterprise may be department specific. For example, workspace B may be associated with department 210 and some users shown as example user A 208, and workspace N 245 can be associated with departments 212 and 216 and users shown as example user B 214.

Figure 3:
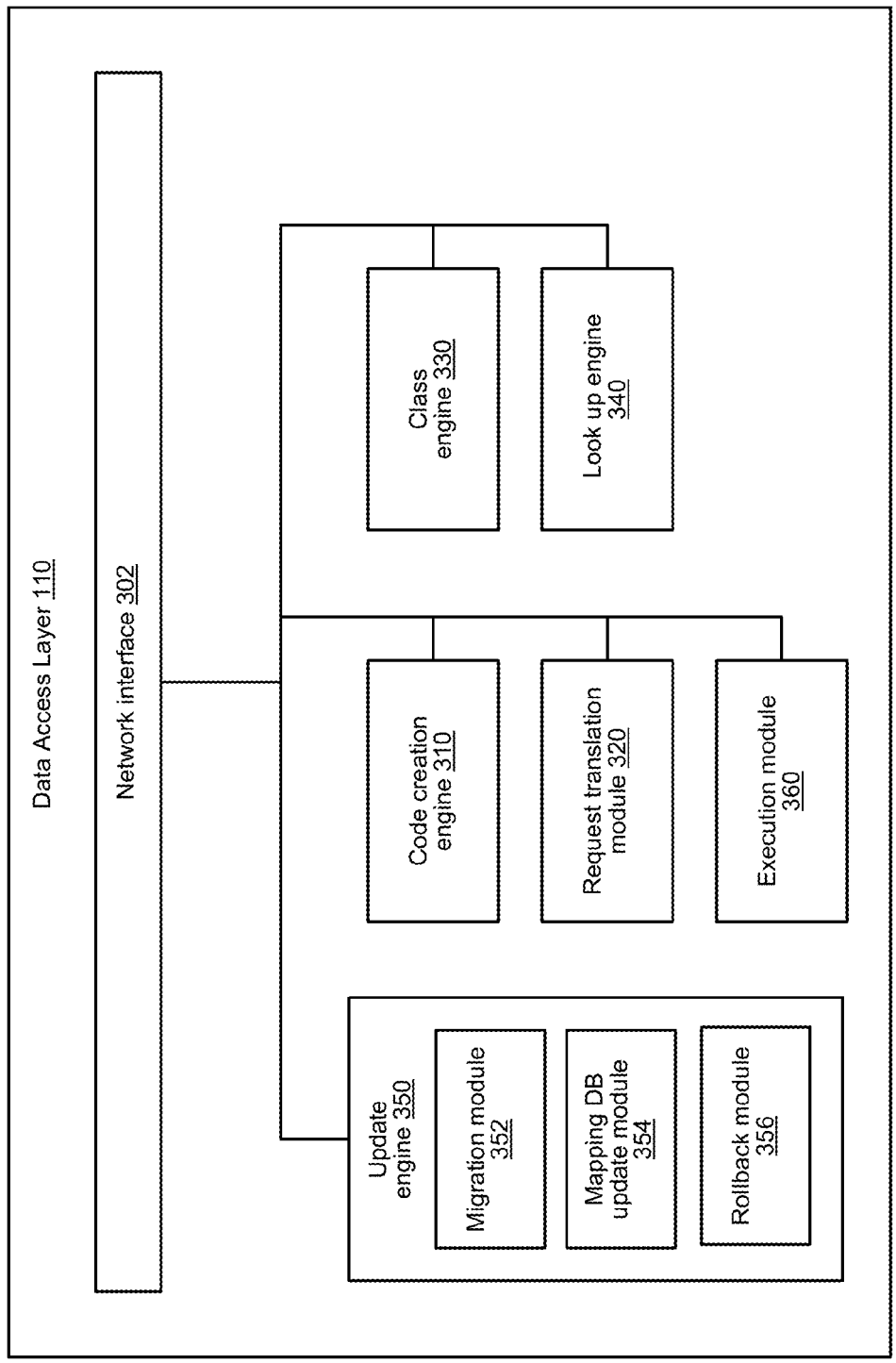
FIG. 3 depicts a block diagram illustrating an example of components in the data access layer (e.g., object relational mapping (ORM)) of the host server of a cloud-based platform (e.g., cloud-based collaboration and/or storage platform/service).

FIG. 3 depicts a block diagram illustrating an example of components in the data access layer component 110 of the host server 100 of a cloud-based platform (e.g., cloud-based collaboration and/or storage platform/service).

The host server 100 of the cloud-based platform (e.g., cloud-based collaboration and/or storage platform/service) can generally be a cloud-based service. The data access layer 110 of the host server 100 can include, for example, a network interface 302, a code creation engine 310, a request translation module 320, a class engine 330, a look up engine 340, an update engine 350, and/or an execution module 360. The update engine 350 can include a migration module 352, a mapping database update module 354, and/or a rollback module 356. Additional or fewer components/modules/engines can be included in the host server 100, data access layer 110 and each illustrated component.

The network interface 302 can be a networking module that enables the data access layer 110 to mediate data in a network with an entity that is external to the data access layer 110, through any known and/or convenient communications protocol supported by the data access layer 110 (e.g., object relational mapping (ORM)) and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module" or an "engine" includes a general purpose, dedicated or shared processor and, typically, firmware or software modules that are executed by the processor. Depending upon implementation-specific or other considerations, the module or engine can be centralized or its functionality distributed. The module or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

Some embodiments of the data access layer 110 include the code creation engine 310 which can create a code representation for each table stored in the collective shard databases 1-n 120-1 . . . 120-n. For example, for a file table that includes stored files, the data access layer 110 creates a type of object that is a file, i.e., a file object, and for a folder table, the data access layer 110 creates a type of object that is a folder, i.e., a folder object. These code objects are manipulated by the web application used by a user to make a database query.

FIG. 4 depicts an example schema layout. The layout can include a mapping database 130, a global application database 135, a shard database 1 120-1, and a shard database 2 120-2.

The mapping database 130 can include a user table that maps a user identification, user_id, to a shard identification, shard_id; an enterprise table that maps an enterprise identification, enterprise_id to a shard_id; a file table that maps a file identification, file_id, to a shard_id; and a folder table that maps a folder identification, folder_id, to a shard_id.

The global application database 135 can include a user table that associates a user_id with a name of the user and other user information; and an enterprise table that associates an enterprise_id with a name of the enterprise and other enterprise information.

The shard database 1 120-1 and the shard database 2 120-2 can each include a file table and a folder table that include respective data in the shard databases. The file table associates a file_id with a user_id and other file information; and the folder table associates a folder_id with a user_id and other folder information.

Some embodiments of the data access layer 110 include the class engine 330 which maps each database table to a class in the code representation, for example, there can be a file class and a folder class. For every class, the class engine 330 defines its database keys. For example, for the file class, defined database keys can be file identification (file_id), file name, parent folder, and owner.

For every class, the class engine 330 also defines mapping keys that can be used to look up in the mapping database where a particular object is located, that is, a shard identification location. For example, because all of a user's files and folders are co-located on the same shard database, whichever shard database that a user is mapped to, the content owned by that user will be located there. Thus, user identification (user_id) is a mapping key that can be used for the file class and the folder class.

As an example, if a query for a particular file identification is received, rather than going to the shard databases to look for the file identification, the data access layer 110 goes to the mapping database 130 to determine which shard database that particular file is stored in. Then the data access layer 110 goes directly to the identified shard database to retrieve the information in response to the request.

Some embodiments of the data access layer 110 include the request translation module 120 which receives database requests via a web application from a user and translates the request to a query on the shard databases 120-1 . . . 120-n. The request translation module 120 also determines whether the fields of the received request are merely regular keys or are mapping keys.

If the request translation module 120 determines that the received request includes a mapping key, the mapping key is used by the look up engine 340 to look up in the mapping database 130 where the queried object is currently located and where objects belonging to the new owner reside. From this information, the look up engine 340 further determines whether the location of the object needs to be moved to a different shard database, i.e., an online shard migration.

As an example, if the received request is file set_owner (new_owner), i.e., setting a new owner for a file, the request translation module 120 determines that new_owner is a mapping key. Subsequently, the look up engine 340 finds in the mapping database the current owner of the file and then compares the assigned shard database for the current owner and the new owner. If the assigned shard database is different for the current owner and the new owner, the file needs to be moved with an online shard migration process. If the assigned shard database is the same, the file location remains in its current shard database location.

If the request translation module 120 determines that the received request only uses regular keys, not mapping keys, there is no need to consider whether the requested object needs to be moved to a different shard database. For example, if the user wants to modify a file and the request translation module 120 receives a file set_date request, the request translation module 120 identifies that no mapping keys are used in the fields of the request. Then the execution module 360 executes the database request and simply makes the modification because it does not involve an online shard migration.

The update engine 350 performs the online shard migration to move the location of objects within the shard databases. Within the cloud-based platform (e.g., cloud-based collaboration and/or storage platform/service), this can arise when two users collaborate on a folder. With collaboration, a user can have access to a folder located on a shard database different from the shard database in which objects owned by that user are stored. Further, a user can move a file into a collaborator's folder, thus transferring ownership of the file to the collaborator. When ownership of a file or folder changes, if the assigned shard database of the transferor (current owner) is different from the assigned shard database of the transferee (new owner), an online shard migration needs to be performed.

The online shard migration process involves transactions on three databases, the original shard database, the new shard database, and the mapping database. The migration module 352 copies items from a first shard to a second shard during an online shard migration and subsequently removes the copied items from the first shard, and the mapping database update module 354 updates the corresponding mapping in the mapping database when an online shard migration is performed.

The online shard migration process starts by opening a first transaction on the mapping database, a second transaction on the original source shard, and a third transaction on the new destination shard. When these transactions are begun, the contents of the rows of the three databases that will be involved in the shard migration process are locked to block access to the data during the process.

Then the appropriate rows on the original source shard are selected for updating, and the corresponding rows in the mapping database are updated to the new destination shard. Next, the new rows are inserted in the new destination shard, and finally, the content is deleted on the original source shard. The transaction on the destination shard is committed first, then the transaction on the mapping database is committed, and last, the transaction on the source shard is committed.

The rollback module 356 monitors the online shard migration process and erases any changes made to the three databases if any problems arise during the shard migration process.

Shard migration has been discussed above with respect to files. With folders that can contain files and other folders, the process is slightly different. If the data access layer 110 receives a request folder set_owner (new_owner), i.e., setting a new owner for a folder, the mapping process is similar to setting a new owner for a file, but in this case, if the shard database on which data owned by the new owner is different from the shard database on which the folder is currently stored, not only does the folder migrate to the new shard database but other folders stored within the folder migrate as well. All the related objects should be copied over to the new shard database to maintain co-location of the stored objects for each user.

Figures 5A, 5B:
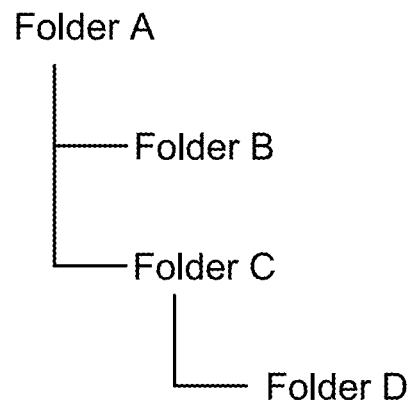
FIG. 5A shows an example folder tree for a database.
FIG. 5B shows a table indicating the parent folder and the path for folders in a folder tree.

FIG. 5A shows an example folder tree for a database. Folder B and folder C are contained in folder A, and folder D is contained in folder C. For each folder stored in the shard databases, two pieces of information are stored, the parent folder and a path in the folder tree that indicates where the folder is located. This information is shown in a table in FIG. 5B. Because folder A is at the top of the folder tree, the parent is the root, and the path for folder A is the top-level, indicated by a forward slash in the table in FIG. 5B. For both folders B and C, the parent folder is folder A, and the path is under folder A. And for folder D, the parent folder is folder C, and the path to folder D is from the root through folder A and then through folder C.

With this information, a tree-based prefix query can be performed for all folders having a path in, for example, folder A's tree. With a prefix query, the identification for a particular file and folder is not looked up in the mapping database, rather, all folders that match the path with folder A are located in the same database as folder A. These folders will need to be moved along with folder A to maintain co-location of objects that belong to a particular user.

Figure 6:
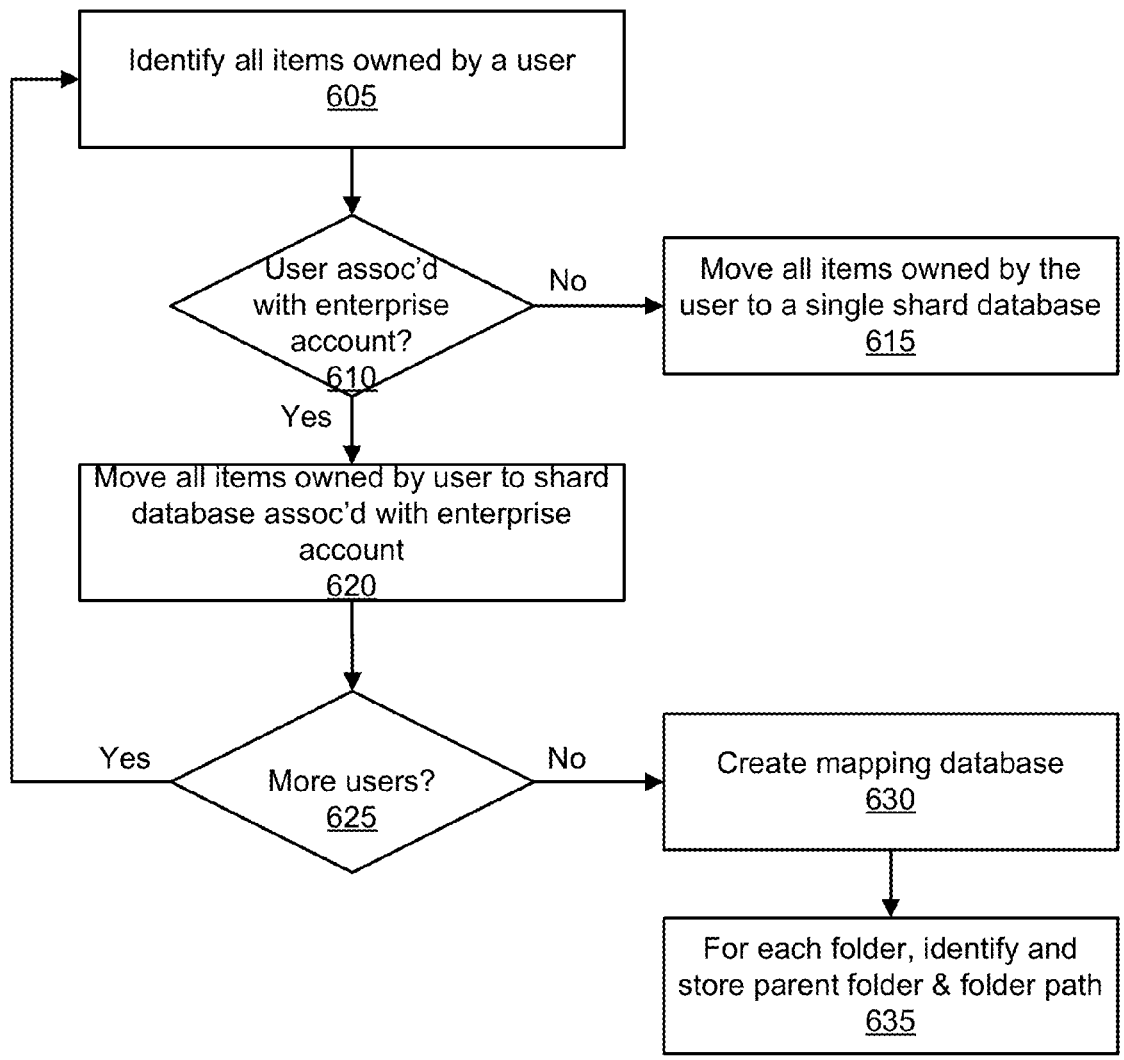
FIG. 6 depicts a flow chart illustrating an example process for partitioning an existing database based on ownership of the data.

FIG. 6 depicts a flow chart illustrating an example process for partitioning an existing database based on ownership of the data.

At block 605, the data access layer (e.g., object relational mapping (ORM)) identifies all items owned by one selected user out of all the users for which the database stores data. Then at decision block 610, the data access layer determines whether the user is associated with an enterprise account provided by a cloud-based platform. If the user is not associated with an enterprise account (block 610—No), at block 615, the data access layer moves all items owned by the selected user to a single shard database.

If the user is associated with an enterprise account (block 610—Yes), at block 620, the data access layer moves all items owned by the selected user to a shard database associated with the enterprise account. Then at decision block 625, the data access layer determines if there are any more users in the list of users for which the data access layer needs to evaluate for the partitioning process. If data for all users using the database have been partitioned (block 625—No), at block 630 the data access layer creates a mapping database. The mapping database maintains a listing of which shard database the data owned by each user is located in. And at block 635, the data access layer identifies the parent and path for each folder and stores this information.

If there is another user to be evaluated for the partitioning process (block 625—Yes), the process returns to block 605 where all items owned by the next user are identified.

Figure 7:
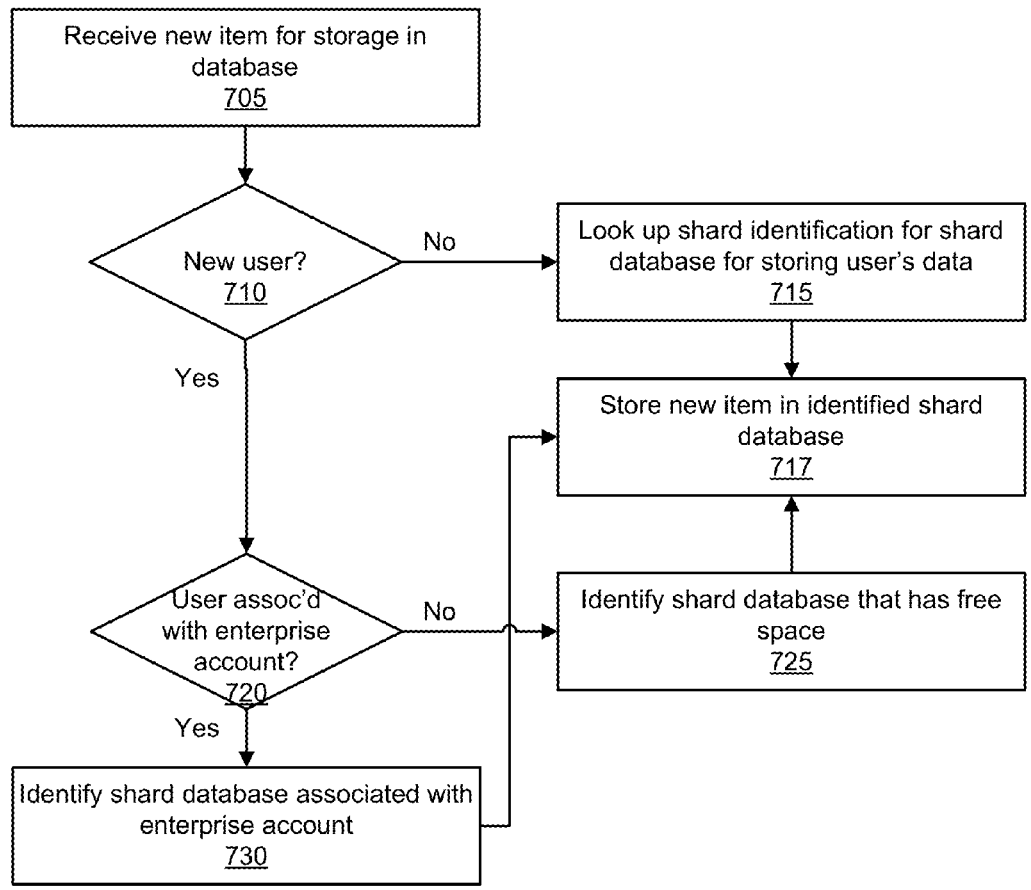
FIG. 7 depicts a flow chart illustrating an example process for adding a new item to a partitioned database.

FIG. 7 depicts a flow chart illustrating an example process for adding a new item to a partitioned database.

At block 705, the data access layer receives a new item (file, folder, or combination) for storage in the database. Then at decision block 710, the data access layer determines whether the user who owns the new item is a new user. If the database already stores items owned by the user (block 710—No), at block 715, the data access layer looks up the shard identification for the shard database that stores the items owned by the user. Then at block 717, the data access layer stores the new item in the identified shard database.

If the user does not already have items stored in the database (block 710—Yes), then at decision block 720, the data access layer determines whether the user is associated with a particular enterprise account. If the user is not associated with an enterprise account (block 720—No), at block 725, the data access layer identifies a shard database that has free space for storing the new items. Then at block 717, the data access layer stores the new item in the identified shard database.

If the user is associated with an enterprise account (block 720—Yes), at block 730, the data access layer identifies the shard database associated with the enterprise account of the new user, and the process continues to block 717.

Figure 8A:
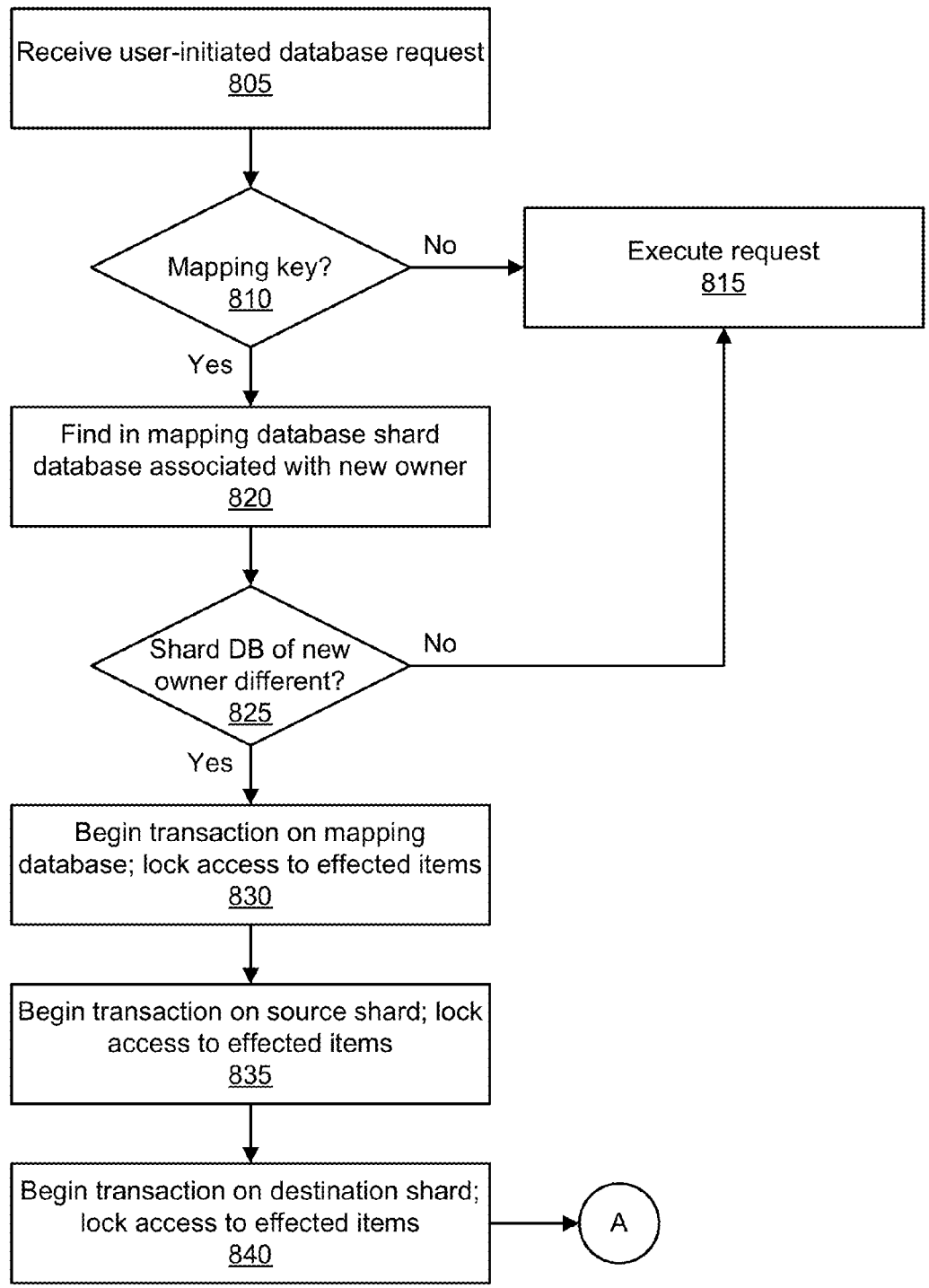
FIGS. 8A-8B depict a flow chart illustrating an example process for receiving and executing a request on a horizontally scaled database partitioned based on the owner of the data.
Figure 8B:
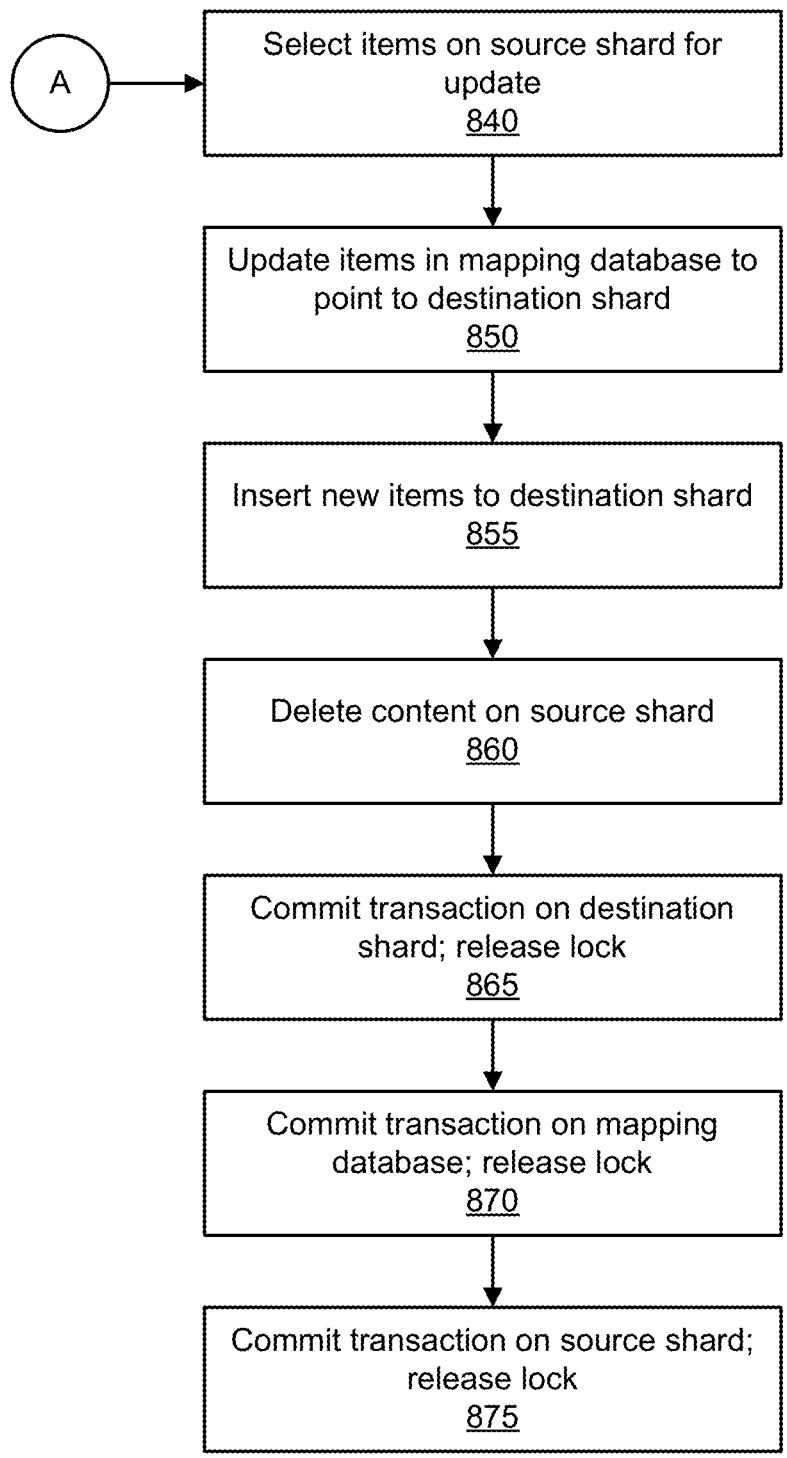

FIGS. 8A-8B depict a flow chart illustrating an example process for receiving and executing a request on a horizontally scaled database partitioned based on the owner of the data.

At block 805, the data access layer receives a database request, for example, the database request can be 'file set data' or 'file set owner.' Then at decision block 810, the data access layer determines whether one of the fields of the request is a mapping key. If none of the fields of the request is a mapping key (block 810—No), the request will not entail consideration as to whether the data needs to be moved to a different shard database. And at block 815, the data access layer executes the received request.

If one of the fields of the request is a mapping key (block 810—Yes), at block 820, the identified mapping key is used with the mapping database to find the shard database in which data for the new owner is stored.

Then at decision block 825, the data access layer determines if the shard database in which data for the new owner is stored is different from the shard database storing data for the current owner. If the shard database is the same (block 825—No), at block 815, the data access layer executes the request. If the shard database is different (block 825—Yes), an online shard migration process ensues.

At block 830, the data access layer begins the transaction on the mapping database, and access to rows or items in the mapping database that will be effected are locked; at block 835, the transaction on the source shard database begins, and access to rows or items in the source shard database that will be effected are locked; and at block 840, the transaction on the destination shard database begins, and access to rows or items in the destination shard database that will be effected are locked.

Then at block 840, the rows on the source shard database are selected for updating. Next, at block 850, the appropriate rows or items in the mapping database are updated to indicate the new destination shard database. Then, at block 855, the new rows of data or items are inserted into the appropriate table of the destination shard database. And at block 860, the copied content is deleted from the source shard database.

Then at block 865, the transaction on the destination shard database is committed, and the lock on the rows or items in the destination shard database is released; at block 870, the transaction on the mapping database is committed, and the lock on the rows or items in the mapping database is released; and at block 875 the transaction on the source shard database is committed, and the lock on the rows or items in the source shard database is released.

Figure 9:
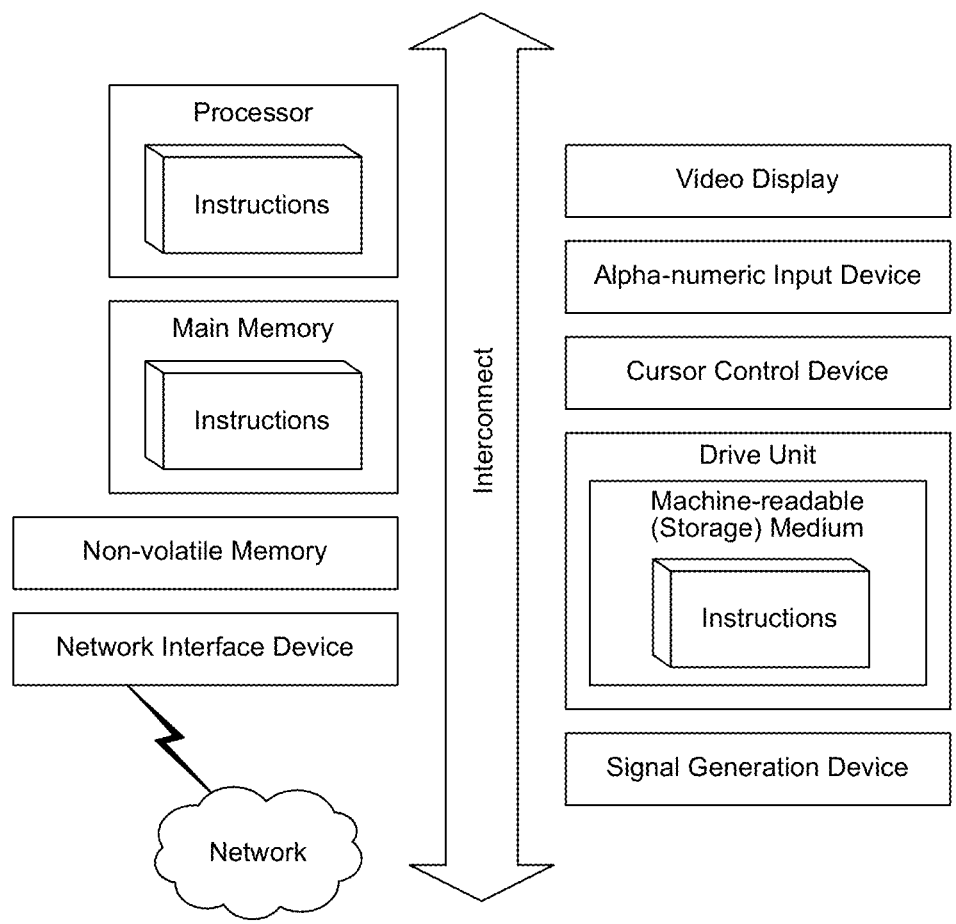
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a wearable smart electronic wireless device (e.g., an electronic glasses—Google glass, a smart watch (e.g., a Google watch), a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the disclosure.

What is claimed is:

1. A method of database partitioning within a collaborative environment hosted by a cloud-based platform, the method comprising:
    partitioning a database into multiple shard databases based upon ownership of one or more objects stored in the database, wherein the one or more objects are stored within a given one of the multiple shard databases based upon an association of the one or more objects with a user identification;
    mapping within a mapping database, a first user identification to a first shard database and a second user

13 identification to a second shard database, wherein the mapping database, the first shard database, and the second shard database are associated with the cloud-based platform that supports collaboration between a first user having the first user identification and a second user having the second user identification;

providing, via the cloud-based platform, to the second user, access to a collaboration folder that is owned by the first user, wherein the collaboration folder is located in the first shard database, wherein the collaboration folder is identifiable by a parent folder and a path that indicates a location of the collaboration ion folder within a folder tree;

receiving a request to transfer the association of the one or more objects and the collaboration folder from the first user identification to the second user identification;

migrating ownership of the one or more objects and the collaboration folder from the first shard database of the cloud-based platform to the second shard database of the cloud-based platform,
wherein the migrating includes migrating the collaboration folder and one or more folders stored within the collaboration folder;

inserting an access lock on the one or more objects and the collaboration folder in the mapping database, the first shard database, and the second shard database;

updating a status of the one or more objects and a status of the collaboration folder in the mapping database to point to the second shard database;

moving the one or more objects and the collaboration folder from the first shard database associated with the first user identification to the second shard database associated with the second user identification;

deleting the one or more objects and the collaboration folder from the first shard database; and releasing the access lock on the one or more objects and the collaboration folder in the second shard database, the mapping database, and the first shard database.

2. The method of claim 1, wherein at least a subset of users of the database are associated with an enterprise account provided by a cloud-based platform, and further wherein the one or more objects associated with the subset of users are stored in the single shard database.

3. The method of claim 2, further comprising:
permitting an administrator of the enterprise account to query database objects associated with the subset of users associated with the enterprise account.

4. The method of claim 1, further comprising:
receiving a database-related request for a first object, the first object included in the one or more objects;
upon determining that the database-related request involves transfer of association of the first object from the first user identification to the second user identification, identifying a third shard database that stores objects associated with the first user identification and a fourth shard database that stores objects associated with the second user identification, wherein the third shard database and the fourth shard database are included in the multiple shard databases;
moving the first object from the third shard database to the fourth shard database, upon determining that the third shard database is different from the fourth shard database; and
updating the mapping database to reflect the movement of the first object to the fourth shard database.

14

5. The method of claim 4, wherein determining that the database-related request involves transfer of association includes:
identifying a field of the database-related request as a mapping key used by the mapping database to identify a shard database included in the multiple shard databases that stores the first object.

6. The method of claim 4, wherein the first object is a folder, the method further comprising:
determining one or more objects stored within the first object;
moving the one or more objects stored within the first object to the fourth shard database, upon determining the third shard database is different from the fourth shard database.

7. The method of claim 6, wherein determining that the one or more objects are stored within the first object comprises using a prefix query with the first object.

8. The method of claim 6, wherein a parent for the folder and a path for the folder are stored for use in responding to the prefix query.

9. The method of claim 1, further comprising:
receiving a database-related request for a second object;
upon determining that the database-related request does not involve transfer of association of the second object, executing the database-related request.

10. The method of claim 9, wherein the determining that the database-related request does not involve transfer of association comprises determining that fields of the database-related request do not include a mapping key, wherein the mapping key is used with the mapping database to determine in which one of the multiple shard databases a particular object is stored.

11. The method of claim 10, wherein the multiple shard databases are used to store data for a cloud-based platform.

12. The method of claim 1, wherein the one or more objects stored in the database have a single owner.

13. A method of performing shard migration within a collaborative environment hosted by a cloud-based platform, the method comprising:
mapping within a mapping database, a first user identification to a first shard database and a second user identification to a second shard database, wherein the mapping database, the first shard database, and the second shard database are associated with the cloud-based platform that supports collaboration between a first user having the first user identification and a second user having the second user identification, wherein one or more objects are stored in the first shard database and associated with the first user identification;
receiving a request that involves change of association of the one or more items stored in one of multiple shard databases in the cloud-based platform;
providing, via the cloud-based platform, to the second user, access to a collaboration folder that is owned by the first user, wherein the collaboration folder is located in the first shard database, wherein the collaboration folder is identifiable by a parent folder and a path that indicates a location of the collaboration folder within a folder tree;
migrating ownership of the one or more objects and the collaboration folder from the first shard database of the cloud-based platform to the second shard database of the cloud-based platform, wherein the migrating includes migrating the collaboration folder and one or more folders stored within the collaboration folder; and moving the one or more items and the collaboration folder from a source shard database associated with a first user identification to a destination shard database associated with a second user identification updating a status of the one or more items and a status of the collaboration folder in the mapping database to point to the destination shard database;

inserting the one or more items and the collaboration folder from the source shard database into the destination shard database;

deleting the one or more items and the collaboration folder from the source shard database.

14. The method of claim 13, wherein access to the one or more items in the source shard database, the mapping database, and the destination shard database are locked while moving the one or more items.

15. The method of claim 13, further comprising:
upon determining that there is a problem with moving the one or more items from the source shard database to the destination shard database, reinstating a state of the mapping database, the source shard database, and the destination shard database to a state prior to the moving of the one or more items.

16. The method of claim 13, wherein the multiple shard databases are used to store the items for collaboration via the cloud-based platform.

17. The method of claim 13, wherein each of the one or more items stored in the multiple shard databases has a single owner.

18. A system for performing shard migration to support functions of a cloud-based platform, the system comprising:
a processor;
a memory having stored thereon instructions which, when executed by the processor, causes the system to:
map, within a mapping database, a first user identification to a first shard database and a second user identification to a second shard database, wherein the mapping database, the first shard database, and the second shard database are associated with the cloud-based platform that supports collaboration between a first user having a first user identification and a second user having a second user identification, wherein one or more objects are stored in the first shard database and associated with the first user identification;
receive a request that involves change of association of the one or more objects stored in one of multiple shard databases;
provide, via the cloud-based platform, to the second user, access to a collaboration folder that is owned by the first user, wherein the collaboration folder is located in the first shard database, wherein the collaboration folder is identifiable by a parent folder and a path that indicates a location of the collaboration folder within a folder tree;
migrate ownership of the one or more objects and the collaboration folder from the first shard database of the cloud-based platform to the second shard database of the cloud-based platform,
wherein the migrating includes migrating the collaboration folder and one or more folders stored within the collaboration folder;
move the one or more objects and the collaboration folder from a source shard database associated with a first user identification to a destination shard database associated with a second user identification, wherein upon the move the one or more objects appear in the destination shard database and are removed from the source shard database; and
update a status of the one or more objects and a status of the collaboration folder in the mapping database to point to the destination shard database.

19. The system of claim 18, wherein moving the one or more objects comprises:
inserting the one or more objects from the source shard database into the destination shard database; and
deleting the one or more objects from the source shard database.

20. The system of claim 19, wherein the system is further caused to:
lock access to the source shard database, the mapping database, and the destination shard database while moving the one or more objects.

21. The system of claim 18, wherein the system is further caused to:
upon encountering a problem with moving the one or more objects from the source shard database to the destination shard database, return the mapping database, the source shard database, and the destination shard database to a state prior to the moving of the one or more objects.

22. A non-transitory machine-readable storage medium having stored thereon instructions which, when executed by a processor, cause the processor to:
partition a database into multiple shard databases based upon ownership of objects stored in the database, wherein the objects are stored within one of the multiple shard databases based upon an association of the objects with a user identification, wherein the user identification uniquely corresponds to a single shard database in the multiple shard databases;
map, within a mapping database, a first user identification to a first shard database and a second user identification to a second shard database, wherein the mapping database, the first shard database, and the second shard database are associated with a cloud-based platform that supports collaboration between a first user having the first user identification and a second user having the second user identification, wherein the one or more objects are stored in the first shard database and associated with the first user identification;
provide, via the cloud-based platform, to the second user, access to a collaboration folder that is owned by the first user, wherein the collaboration folder is located in the first shard database, wherein the collaboration folder is identifiable by a parent folder and a path that indicates a location of the collaboration folder within a folder tree;
receive a request to transfer the association of the objects and the collaboration folder from the first user identification to the second user identification; and
migrate ownership of the one or more objects and the collaboration folder from the first shard database of the cloud-based platform to the second shard database of the cloud-based platform,
wherein the migrating includes migrating the collaboration folder and one or more folders stored within the collaboration folder;
move the one or more objects and the collaboration folder from the first shard database associated with the first user identification to the second shard database associated with the second user identification, wherein upon the move, the one or more objects appear in the second shard database and are removed from the first shard database; and update a status of the one or more objects and a status of the collaboration folder in the mapping database to point to the second shard database.

23. The non-transitory machine-readable storage medium of claim 22, wherein the instructions further cause the processor to:

maintain a key in the mapping database, wherein the key maps the objects stored in the database to the multiple shard databases.

24. The non-transitory machine-readable storage medium of claim 22, wherein the instructions further cause the processor to:

receive a request pertaining to a first database object, the first database object included in the objects;

upon determining that the request involves transfer of association of the first database object from a first user to a second user, identifying a third shard database that stores objects associated with the first user and a fourth shard database that stores objects associated with the second user;

moving the first database object from the third shard database to the fourth shard database, upon determining that the third shard database is different from the fourth shard database; and updating the mapping database to reflect the movement of the first object to the fourth shard database.

25. The non-transitory machine-readable storage medium of claim 24, wherein the first database object is a folder, and wherein the instructions further cause the processor to:

determine one or more objects stored within the first database object;

move the one or more database objects stored within the first database object to the fourth shard database, upon determining that the third shard database is different from the fourth shard database.

26. The non-transitory machine-readable storage medium of claim 22, wherein the instructions further cause the processor to:

receive a request pertaining to a second database object;

upon determining that the request does not involve transfer of association of the second database object, execute the request.

27. An apparatus for performing shard migration for a cloud-based collaboration platform, the apparatus performing the operations of:

a memory having stored thereon instructions and coupled to a processor;

the processor configured for:

mapping, based on mapping metadata, a user identification to a shard database included in multiple databases that store one or more items based upon an association of the one or more items with the user identification, wherein the user identification uniquely corresponds to a single shard database in the multiple shard databases, wherein the mapping metadata identifies a first user having a first user identification and a second user having a second user identification, wherein the one or more items are stored in the first shard database and associated with the first user identification;

receiving a request and determining whether the request involves a change of association of one or more items in the cloud-based collaboration platform; and providing, via the cloud-based collaboration platform, to the second user, access to a collaboration folder that is owned by the first user, wherein the collaboration folder is located in a first shard database, wherein the collaboration folder is identifiable by a parent folder and a path that indicates a location of the collaboration folder within a folder tree, wherein the first shard database and the second shard database are included in the multiple databases;

migrating ownership of the one or more items and the collaboration folder from the first shard database of the cloud-based collaboration platform to the second shard database of the cloud-based collaboration platform, wherein the migrating includes migrating the collaboration folder and one or more folders stored within the collaboration folder; and moving the one or more items and the collaboration folder from the first shard database of the cloud-based collaboration platform to the second shard database of the cloud-based collaboration platform responsive to the request wherein the second shard database is different from the first shard database; and updating the mapping metadata that maps the one or more items and the collaboration folder in the cloud-based collaboration platform to the user identification for determining whether the first shard database or the second shard database stores the one or more items.

28. The apparatus of claim 27, further performing the operations of:

executing the request upon determining that the request does not involve a change of association in the cloud-based collaboration platform.

* * * * *